(12) United States Patent
Strickland et al.

(10) Patent No.: US 6,606,565 B1
(45) Date of Patent: Aug. 12, 2003

(54) HIGH RESOLUTION ARRAY INDUCTION TOOL

(75) Inventors: Robert W. Strickland, Austin, TX (US); Gulamabbas A. Merchant, Houston, TX (US); Randal T. Beste, Houston, TX (US); Kenneth Babin, Lafayette, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/460,553

(22) Filed: Dec. 14, 1999

Related U.S. Application Data

(60) Provisional application No. 60/112,161, filed on Dec. 14, 1998.

(51) Int. Cl.$^7$ .................................................. G01V 3/18
(52) U.S. Cl. .......................................... 702/7; 324/339
(58) Field of Search ................................ 324/339, 338; 702/7

(56) References Cited

U.S. PATENT DOCUMENTS

| | | | | | |
|---|---|---|---|---|---|
| 3,147,429 A | * | 9/1964 | Moran | ............................ | 324/6 |
| 4,513,376 A | * | 4/1985 | Barber | ....................... | 364/422 |
| 5,065,099 A | * | 11/1991 | Sinclair et al. | ............. | 324/339 |
| 5,146,167 A | * | 9/1992 | Strickland et al. | ........... | 324/339 |
| 5,867,806 A | * | 2/1999 | Strickland et al. | ............. | 702/7 |
| 6,101,447 A | * | 8/2000 | Poe, Jr. | ........................ | 703/13 |
| 6,216,089 B1 | * | 4/2001 | Minerbo | ........................ | 702/7 |

\* cited by examiner

Primary Examiner—Edward Lefkowitz
Assistant Examiner—Victor J. Taylor
(74) Attorney, Agent, or Firm—Conley Rose, P.C.

(57) ABSTRACT

A coil array for high resolution induction logging comprises a transmitter, a first receiver set positioned at a first distance from the transmitter and a second receiver set positioned at a second distance from the transmitter, and the second receiver set includes at least one portion of the first receiver set. Also disclosed is a method for deriving an apparent conductivity log from at least one induction well log that comprises a plurality of depth samples, comprising the steps of raising each depth sample of the apparent conductivity signal to several predetermined powers to generate a plurality of powers of conductivity, convolving in depth the powers of conductivity with a plurality of filters, where each power has a distinct filter, and summing the results of all of the convolutions to produce a conductivity log that is substantially free from the effects of adjacent beds and the nonlinear effects of true conductivity. Also disclosed is an apparatus for measuring the resistivity of an earth formation penetrated by a borehole, comprising at least one transmitter that is energized by a time-varying, periodic voltage, at least one set of receivers generating a receiver voltage, an analog-to-digital converter that periodically samples the receiver voltage at a predetermined sampling rate and outputs a digitized voltage signal, a processor that receives the digitized voltage signal, and a set of N accumulators that collates and averages successive sets of N samples from the analog-to-digital converters to output a set of N averages.

14 Claims, 7 Drawing Sheets

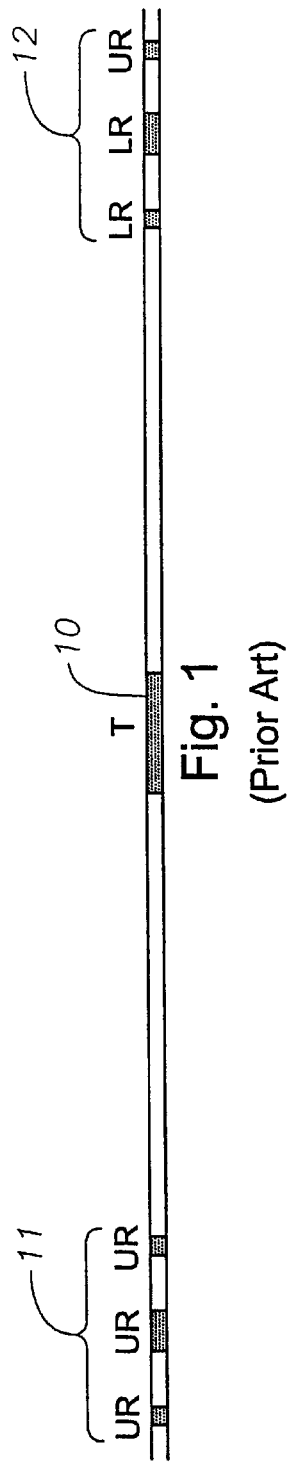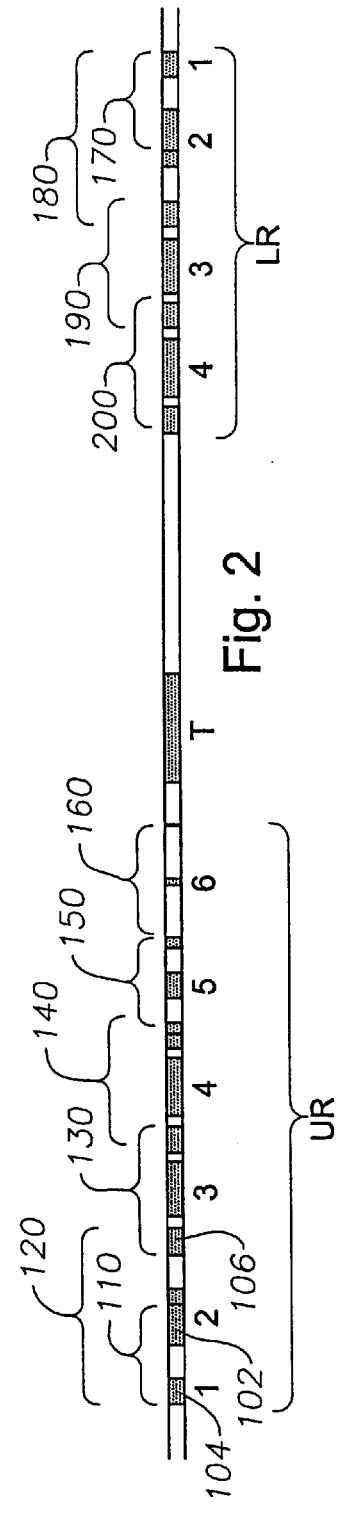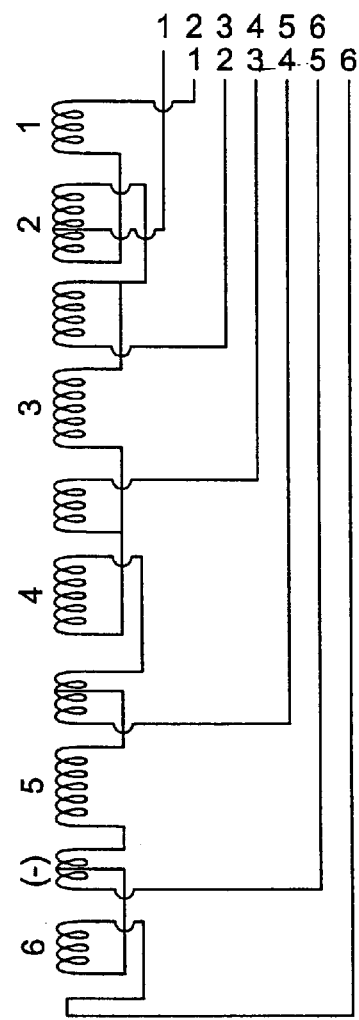

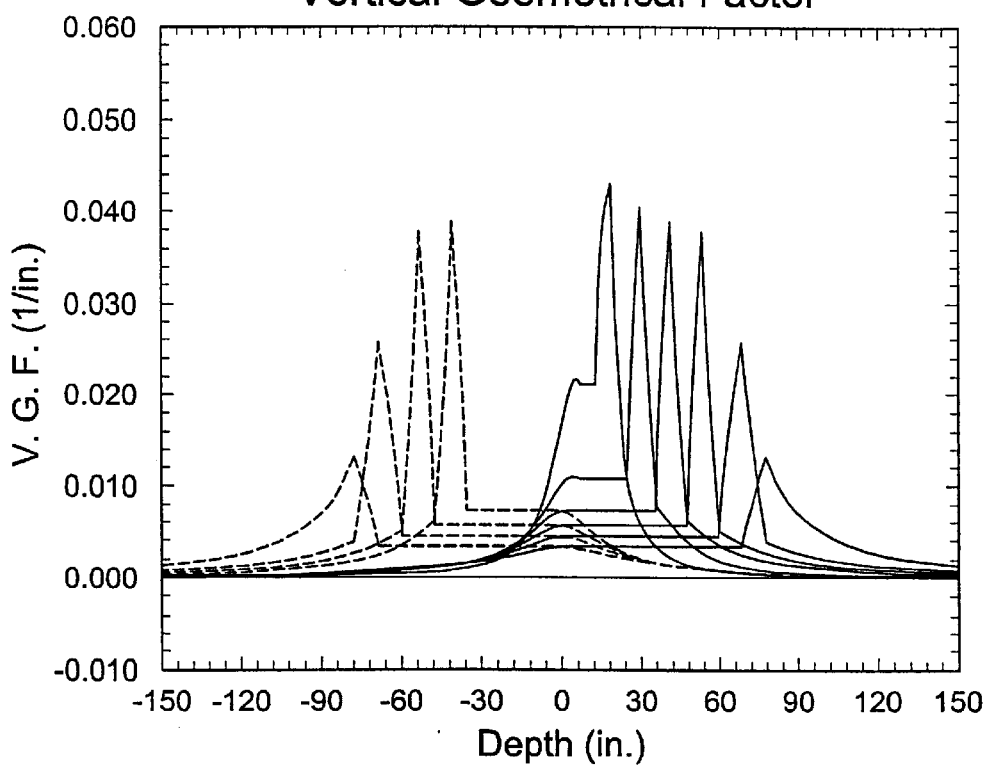
Fig. 4 Vertical Geometrical Factor
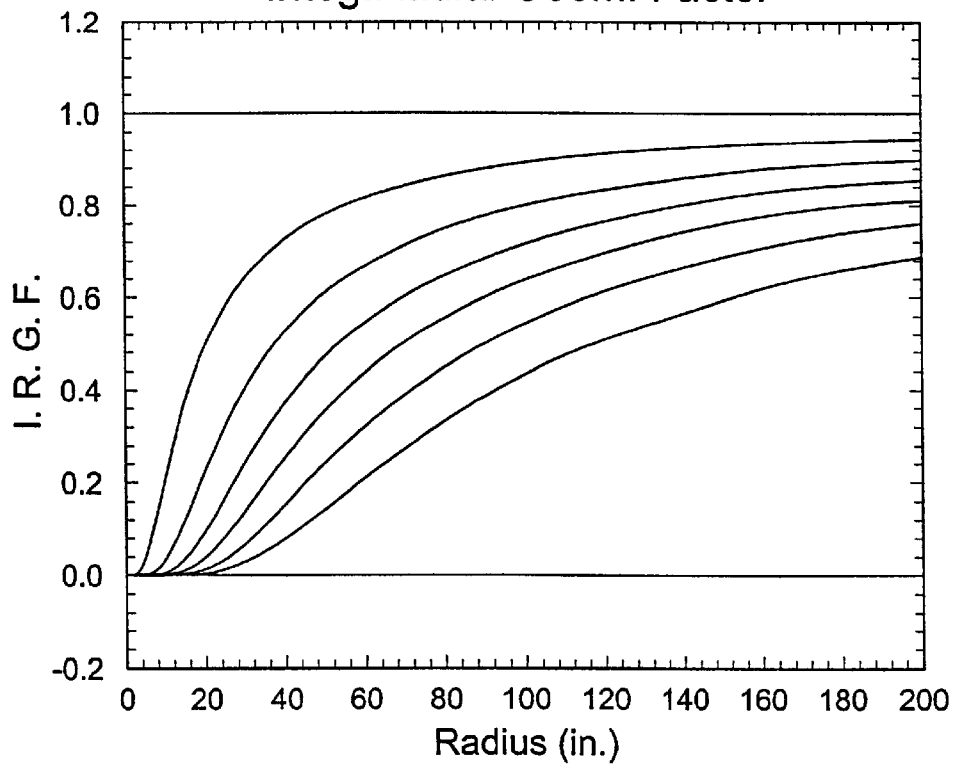
Fig. 5 Integ. Radial Geom. Factor 128 stride 7 = 146.285714 kHz sampling rate for 50 msec

HIGH RESOLUTION ARRAY INDUCTION TOOL

CROSS-REFERENCE TO RELATED APPLICATIONS

The present application claims the benefit of U.S. Provisional Application Ser. No. 60/112,161, filed Dec. 14, 1998, which is incorporated herein in its entirety.

STATEMENT REGARDING FEDERALLY SPONSORED RESEARCH OR DEVELOPMENT

Not applicable.

TECHNICAL FIELD OF THE INVENTION

The present invention relates to tools for electromagnetic induction well logging instruments. More specifically, the present invention relates to methods for obtaining resistivity meansurements at greater depths and with better vertical resolution that has heretofore been possible. Still more particularly, the present invention relates to a logging tool and operating system therefor that provides high resolution resistivity measurements using a multi-receiver array and novel data processing techniques.

BACKGROUND OF THE INVENTION

In petroleum drilling, it is often desirable to survey the information using a logging tool lowered through the wellbore. Electromagnetic induction well logging instruments are used to make measurements of the electrical resistivity of earth formations penetrated by wellbores. Induction well logging instruments typically include a sonde having a transmitter coil and one or more receiver coils at axially spaced apart locations from the transmitter coil.

The basic element in all multic-coil induction tools is the two-coil sonde. The two-coil sonde consists of a single transmitter coil and a single receiver coil wrapped around an insulating mandrel. The transmitter coil is driven by an oscillating current at a frequency of a few tens of kilohertz. The resulting magnetic field induces eddy currents in the formation which are coaxial with the tool. These eddy currents produce a magnetic field which in turn induces a voltage in the receiver coil. This induced voltage is then amplified, and the component of the voltage that is in-phase with the transmitter current is measured and multiplied by a tool constant to yield an apparent conductivity signal. This apparent conductivity is then recorded at the surface as a function of the depth of the tool.

The two-coil sonde has several practical limitations. Its response is adversely affected by several factors including the borehole, adjacent beds, and mud filtrate invasion. Also, the two-coil sonde is difficult to implement because of the large direct mutual coupling between the coils. Even though this mutual signal is out of-phase with the transmitter current, it is a problem because a very small phase shift in the electronics can cause this mutual coupled signal to "leak" into the apparent conductivity signal. For these reasons, it is the standard practice in the industry to construct induction logging tools with coil arrays which include additional coils. Typically, there are several transmitter coils and several receiver coils. In certain applications, all of the transmitter coils may be connected in series into one circuit. Similarly, all of the receiver coils may be connected in series in a separate circuit. The additional coils served to cancel out the various adverse effects listed above. Such arrays are generally termed "focused arrays."

The following are terms of art that are used often to compare various induction tools. The "vertical resolution" of a tool is a measure of the thinnest bed that a tool can detect. That is, a tool may accurately estimate the thickness of beds that are thicker than its vertical resolution. A tool can also accurately locate a bed boundary to within- the tolerance of its vertical resolution. There is still a significant error in the apparent conductivity reading in a thin bed, which is attributable to signals from adjacent beds; however, so long as the thin bed is thicker than the vertical resolution of the tool, the tool can estimate the thickness of the bed. The error in the apparent conductivity reading of a thin bed attributable to signal from adjacent beds is referred to as "shoulder effect." In known induction tool arrays, the additional coils are arranged to cancel out much of this shoulder effect.

It is also possible for a tool to have good vertical resolution but poor shoulder effect. Such a tool would be able to accurately define bed boundaries but would give poor estimates of the conductivities of these thin beds. Vertical resolution and shoulder effect are two aspects of the vertical focusing of an induction tool coil array.

The "depth of investigation" of a tool is a measure of the average radius of penetration of the signal. The "depth of investigation" is defined as the radius of the cylinder from which half the apparent conductivity signal comes. The "borehole effect" is a measure of how much signal comes from the borehole as compared to the formation. In conventional arrays, coils are arranged to cancel much of the signal coming from near the tool so that the "depth of investigation" will be large and the "borehole effect" will be small.

The foregoing discussion is based on an assumption that a tool can be operated at a sufficiently low frequency that there is no significant attenuation of the transmitted signal as the signal propagates through the formation. In practice, such attenuation cannot be neglected, since it reduces the transmitted signal proportionately more in conductive formations. The voltage actually induced in the receiver coils is typically less than what would be induced for any value of conductivity were the relationship between eddy current magnitude and the induced voltage a linear one. The difference between the voltage actually induced and the voltage that would have been induced if the relationship were linear results from the so-called "skin effect." Prior art practitioners generally attempt to design a coil array which has moderate skin effect at the highest conductivity of interest in logging situations and then correct for the skin effect at the surface. The skin effect correction is typically a correction which yields the true conductivity of a homogeneous formation.

In the case of conventional induction tool arrays, coils must be positioned to define the tool's vertical resolution, depth of investigation, as well as to compensate for borehole and shoulder effect. In addition, the coils must minimize the mutual coupling between transmitter coils and receiver coils, as this signal is very large when compared to most formation signals. In known coil arrays, the position and strength of each coil controls each of these aforementioned effects. Because each of these effects may change as a coil is modified, it is difficult to design a coil array optimized to reduce all of these effects simultaneously. The different effects interact, as one effect is reduced, another is increased. Conventional coil array designs therefore must be a compromise between sharp vertical resolution and deep radial penetration into the formation. In addition, in some prior art tools, the deep measurements lack sufficient vertical resolution, so the high resolution shallow measurements are used to enhance the resolution of the deep coil measurements. This is undesirable, however, particularly when the shallow measurements become corrupted. It would be desirable, therefore, to provide an induction logging tool that permits both sharp vertical resolution and deep radial penetration.

In most commercial applications, it is also desired to investigate the strata surrounding a borehole to different depths, in order to determine the diameter of invasion of the strata by borehole fluids. This requires at least two measurements with contrasting radial response and ideally identical vertical resolution so that differences in the logs obtained will be due to radial anomalies in the formations, such as invasion. Most prior art dual induction tools use deconvolution filters to match dissimilar vertical responses of two induction coil arrays with inherently different vertical resolutions by smoothing out the response of the array with the sharper vertical resolution and degrading it to match the vertical response of the second array. This approach is not desirable in view of the degradation of vertical resolution that is needed to match the different coil arrays.

In another prior art system, separate deep transmitter coils and medium-deep transmitter coils are provided. Because the cross-talk would obscure any signal received from either set of transmitter coils, it is necessary to use a time multiplexing approach. In the time-multiplexing approach, the sets of transmitters are turned on alternately and a settling period is allowed between signals, so that only one signal path is in use at any time. The time-multiplexing approach becomes less practical, however, as the number of coils increases, and is impractical when six or more sets of transmitter coils are used.

Other prior-art systems for array induction logging have a single transmitter coil and sets of receiver coils above and/or below the transmitter. Each set of receiver coils consists of a main receiver coil and a bucking receiver coils. The main coils are positioned at different distances from the transmitter and the coil sets are arranged such that the distances between the main and bucking receivers increase with increasing distance from the transmitter. In such a system, the vertical resolution for the deeper arrays is inferior to the vertical resolution of the shallower arrays. With such a system, the measurements from the deep arrays must be combined with information from the shallow arrays in order to produce a deep response with good vertical resolution. The shallow arrays are more affected by temperature and the borehole, and this system causes errors in the data generated by the shallow arrays to degrade the accuracy of the deep logs.

Thus, a need exists for an array induction tool capable of investigating multiple depths of investigation while maintaining substantially identically vertical resolution for all coil arrays. It is further desirable to provide a tool capable of separating the vertical and radial aspects of the signal processing. A more detailed discussion of these and related problems can be found in U.S. Pat. No. 5,065,099, which is incorporated herein in its entirety.

BRIEF SUMMARY OF THE INVENTION

The present invention includes a coil array and signal processing system that permit sharp vertical resolution and deep radial penetration. Further, the present system is capable of investigating multiple depths of investigation while maintaining substantially identically vertical resolution for all coil arrays. The present coil array and signal processing system allow 10, 20, 30, 60, 90 and 120 inch depths of investigation, with of one and two foot vertical resolutions.

The present tool includes a plurality of coils spaced along the tool body at preferred intervals. Several of the coils are shared between coil sets and several of the coils may be tapped, so that, for example, ten elemental measurements can be made by 19 coils. The size, spacing and direction of winding of the coils allows the present signal processing system to calculate a weighting system that yields conductivity measurements for the preferred depths of investigation. The preferred signal processing system digitized the received waveforms and extracts phase information from the digitized signal.

According to a preferred embodiment, each elemental measurement is deconvolved vertically to match resolution before any radial combination occurs. Further according to the present invention, the output deep measurements (90 and 120 inch depths of investigation) are constructed from only the deepest of the elemental measurements and are not corrupted with the shallow elemental measurements.

BRIEF DESCRIPTION OF THE DRAWINGS

For a more detailed understanding of the preferred embodiments, reference will now be made to the Figures, wherein:

FIG. 1 is a schematic diagram of a prior art induction array;

FIG. 2 is a schematic diagram of an induction array constructed in accordance with the present invention;

FIG. 3 is a wiring diagram for the upper portion of the array of FIG. 2;

FIG. 4 is a plot of vertical geometric factors for the array of FIG. 2;

FIG. 5 is a plot of integrated radial geometric factors for the array of FIG. 2;

DETAILED DESCRIPTION OF THE INVENTION

Figure 6:
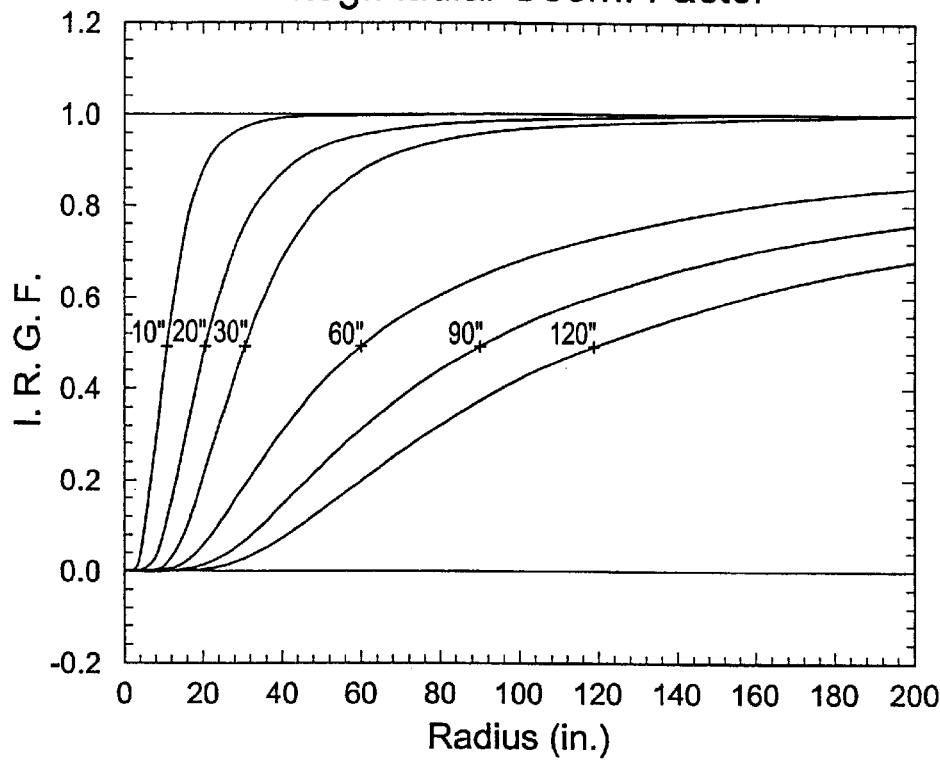
FIG. 6 is a plot of integrated radial geometric factors calculated using selected weights for the array of FIG. 2.

Referring initially to FIG. 1, one type of known coil array uses a single transmitter 10 and two trios of receivers 11, 12 (one trio above the transmitter and one trio below the transmitter), which are connected to and measured by two separate channels in the signal processor. Each trio of receivers 11, 12 includes a main receiver and two bucking receivers that are equally spaced on either side of the main receiver. A detailed discussion of three-receiver sets can be found in U.S. Pat. No. 5,065,099. The bucking receivers have equal turns. The signals from the two trios are measured separately and depth-shifted to align with the center receiver and then averaged. In each trio of receiver coils, the outer bucking receivers are typically wound in series opposition with the central main receiver. The upper and lower trios of receivers 11, 12 are wired separately and measured by separate electronics channels. Thus, the single, central transmitter can be energized continuously. The advantage to this approach is that, because it uses a single transmitter, there can be additional trios of receivers at different spacings with all receiver trios measured simultaneously.

An array induction log is composed of a number of raw elemental measurements. Each elemental measurement is a simple induction tool. The spacings of the elements must be chosen to cover a wide range of depths of investigation with sufficient coverage to be combinable to produce the desired 10, 20, 30, 60, 90 and 120 inch depths of investigation. The configuration of coils and the resulting measurements so as to achieve a target depth of investigation with minimal borehole effect are discussed in detail below.

In preferred embodiments of the present invention, the number of receiver trios is increased to correspond to the number of measurement depths, if desired, and the coils can be configured to provide optimal signal combinations for the desired measurement radii. In addition, it has been discovered that, although a two-receiver measurement is deeper than a three-receiver measurement for a given main transmitter-receiver spacing, a three-receiver measurement has better vertical resolution than a two-receiver measurement.

Radial Profiling

According to the present invention, the weighted average of several elemental coil measurements is used to achieve a radial response that is better than any single elemental measurement. Although the actual array induction processing is two-dimensional (it includes vertical as well as radial deconvolution) in thick beds, the logs from each elemental measurement are constant, and the effects of the vertical and radial deconvolution can be considered separately.

As is known to those skilled in the art, Doll's integrated radial geometrical factor (IRGF) provides a simple induction tool model for cylindrical geometry that is valid in the limit of low formation conductivity or low tool operating frequency. Doll's IRGF is zero at zero radius and increases to one at infinite radius. It is a measure of how much signal comes from inside cylinders of varying radii. The apparent conductivity response $\sigma_a$ to a step invasion profile at a radius r is given by $$\sigma_a(r) = G(r)\sigma_{xo} + [1 - G(r)]\sigma_t \quad (1)$$

where $\sigma_t$ and $\sigma_{xo}$ are the conductivities of the uninvaded and invaded zones, respectively, and G(r) is the integrated radial geometric factor (IRGF) at radius r. If there are n elemental coil measurements, the IRGFs can be combined linearly to produce a composite response given by $$G_c(r) = \sum_{i=1}^{n} w_i G_i(r) \quad (2)$$

where $$\sum_{i=1}^{n} w_i = 1 \quad (3)$$

The weights must sum to unity for the composite measurement to read correctly in a uniform formation. Given a set of elemental coil responses there must be a set of $w_i$ that best achieve a given target response $G_c(r)$. According to the present invention, a target composite response $G_c(r)$ is defined, and then the system is solved for the set of weights $w_i$ that best achieves this target response. The apparent conductivities (the elemental measurements) can be combined in the same way as the Doll IRGFs.

For purposes of analysis, an ideal IRGF was assumed to be a step function that goes from zero to one at some radius. To achieve this response, all of the signal must be confined to a thin cylindrical shell. This ideal response cannot be achieved because deeper coil measurements are less resolved radially than are shallow ones. Thus, the best compromise is to set a target radius point where the IRGF should reach the value 0.5. The IRGF should stay near zero inside a maximum borehole radius, pass through the target 50% point and then go to one as soon as possible. The shape of the curve between the maximum borehole radius and the radius where the IRGF reaches one is relatively unimportant so long as the IRGF is monotonic and stays between zero and one. Past this radius, the IRGF should remain near one.

A nonlinear least-squares function minimizer is one preferred method for to determine the unknown $w_i$, although other suitable methods will be known to those in the art. The function minimizer iteratively varies the unknowns to minimize the sum of the squares of an array of user supplied functions. Because there are more functions than unknowns, the system is over-determined. Also, although this is a linear problem, the nonlinear minimizer allows us to add penalty functions to discourage certain solutions.

According to one preferred embodiment, the error function to be minimized is derived from the IRGF factor itself. A function $y(r_i)$ that can be evaluated at different radii $r_i$ to produce an array of functions $y_i$ to be minimized by varying the unknown weights is defined as follows:

$$y(r) = \begin{cases} 10^8 G_h & \text{for } r < r_h \\ G(r) & \text{for } r_h < r < r_{50\%} \\ [1/2 - G(r)] & \text{for } r = r_{50\%} \\ [1 - G(r)] & \text{for } r_{50\%} < r < 3r_{50\%} \\ 10^6 [1 - G(r)] & \text{for } r \geq 3r_{50\%} \end{cases} \quad (4)$$

where the radius $r_h$ is the desired maximum borehole radius. The radius $r_{50\%}$ is the target 50% radius, the radius at which G reaches one-half of its total value. The factors of $10^8$ and $10^6$ were chosen empirically. The radius $3r_{50\%}$ is the smallest radius of a cylinder that contains nearly all the signal.

In a preferred embodiment, additional logic is used to penalize geometrical factors less than zero or greater than one, so as to discourage undershoots or overshoots. The error in the 50% point $r_{50\%}$ is appended to the vector of functions to be minimized. In addition, the noise gain, $$\left(\sum_{i=1}^{n} w_i^2\right)^{1/2} \quad (5)$$

is appended to the vector of functions to be minimized. This favors solutions with weights of low magnitude to minimize the noise gain, as solutions with large positive or negative weights or highly oscillatory weights are undesirable. The weighting factor for these additional measurements can be chosen by trial and error. There are n−1 unknowns, since the weights must sum to unity. The radii can be fixed so the IRGF of each set can be tabulated before any optimization.

The MINPACK routine LMDIF1, available from Argonne National Laboratory was found to work well for this application. The LMDIF1 routine minimizes the sum of the squares of m nonlinear functions in n variables by a modification of the Levenberg-Marquardt algorithm. This is done by using the more general least-squares solver LMDIF. The user must provide a subroutine that calculates the functions. The Jacobian is then calculated by a forward-difference approximation. In the present application, the minimization program reads in an arbitrary number of coil sets from disk files, tabulates their IRGF, inputs the desired 50% point and maximum borehole diameter. The output is the set of weights and plots of the composite IRGF on regular (invaded zone) and expanded scales-(borehole region). It will be understood that other suitable routines can be substituted for LMDIF1.

It has been discovered that the six depths of investigation that are desired in the preferred embodiment, namely 10, 20, 30, 60, 90 and 120 inches, can be effectively measured using the output from four elemental measurements. Although only four elemental measurements are required, additional measurements will reduce the noise of the achieved actual achieved responses. It is desirable to make the deep measurements as sharp as possible, so that the deep measurements stand alone and do not require the shallow measurements to enhance vertical resolution. The nonlinear solver can be run on each of the sets to create depths of investigations of 10, 20, 30, 60, and 90 inches with minimal borehole effect and minimal noise gain.

In general, a two-receiver measurement is deeper than the corresponding three-receiver measurement by about 20%. Similarly, a logarithmic spacing of the receivers covers the range of depths of investigation more economically, i.e., it concentrates the measurements at shallow spacings, where the response varies rapidly. There are many possible combinations of weights that will achieve equivalent shallow responses.

There is little to be gained from any spacing whose depth of investigation is greater than the deepest synthesized depth of investigation. For example, in one three-receiver set, a main spacing of about 69 inches produced a 90 inch radius of investigation, with no need of radial combination that risks corruption by shallower measurements. Likewise, shallower spacings are more sensitive to variations in tool position in the borehole. Therefore, it is desirable to make the shallowest measurement as deep as possible while still being able to achieve the smallest desired depth of investigation. This is because a shallow response achieved by subtracting two deeper responses will have less borehole effect.

As stated above, two-receiver measurement is deeper than a three-receiver measurement for a given main transmitter-receiver spacing. This is not a limitation so long as there is one elemental measurement with a depth of investigation greater than 90 inches. The reduced depth of investigation of the three-receiver measurement is actually an advantage for the shallow depths of investigation, since it allows them to read shallower with the same spacing. For the intermediate spacings, there is not enough difference in the radial response to prefer one over the other. In order to ensure that the deep measurements are inherently sharp, the three-receiver system is preferred. Within this system, the logarithmic spacing provides the best coverage.

With the present system and method, it is possible to combine the responses of deep and shallow measurements to achieve delicate cancellation in the region of the borehole. There are some real-world considerations that make this undesirable, however. Doll's model assumes a tool centered in a round borehole, for example. The standoff is not measured directly, nor is the shape of the borehole. In addition, the uncertainty and variation in tool position and borehole shape contribute noise to the measurements, which contributes to the residual uncorrectable borehole effect. This noise is much more of a problem with the shallow coil measurements than with deep measurements. If the signal processing for a synthesized output curve contained a mixture of deep and shallow elemental coil measurements, the composite could be corrupted by the uncorrectable borehole effect of the shallow measurements even if the composite output has a deep response. For this reason, it is preferred to allow a small borehole effect on the composite if it allows one to avoid using the shallow measurements. Hence, the deep output curves are preferably composed of only the deep elemental measurements.

Preferred Array

Based on the foregoing preferences, a set of elemental measurements (coil array) can be developed. One preferred set of ten elemental measurements is shown in FIG. 2. Each shaded rectangular block represents a coil. Tapped coils are indicated with a line drawn through the shaded area of the coil. The main receiver coil of each elemental set is numbered and each main receiver is bracketed with its bucking receiver(s). As shown in FIG. 2, a preferred array includes ten elemental measurements, namely 110, 120, 130, 140, 150, 160, 170, 180, 190, and 200. In FIG. 2, the main receiver coils are numbered 1–6.

The deepest three-receiver set 120 preferably has a 72 inch spacing to main coil 102 and a 9 inch spacing to bucking receivers 104, 106. The end bucking coil 104 for the three-receiver set becomes the main receiver for the two-receiver set 120. A tapped portion of the main receiver 102 of the three-receiver set can be used as the bucking receiver for the deepest, two-receiver set 110. The preferred two-receiver measurement has a depth of investigation of about 120 inches.

The next shallowest array 130 can share a bucking receiver 104 with the deepest three-receiver set 120. It is desirable to improve the vertical resolution of this measurement by decreasing the bucking receiver spacing to six inches, since sensitivity is less of a problem with shallow spacings. This makes approximately the same sensitivity for the last three arrays 140, 150, 160. The remainder of the elemental measurements continue with the six inch bucking receiver spacing and share all or a portion of the bucking receivers of their nearest neighbors. The shallow arrays have a surplus of signal. In order to save wire, it is desirable to use fewer turns on the shallower arrays. For this reason, an end tap is placed on one of the bucking receivers.

The lower receivers 170, 180, 190, 200 are preferably mirrors of upper receivers 110, 120, 130 and 140, respectively. The two shallowest upper receiver arrays 150, 160 are not mirrored in the lower coils, although in an alternative embodiment, the array could be made fully symmetric.

Referring now to FIG. 3, each electronics channel is preferably connected to a pair of wires. For example, the receiver electronics for receiver channel 3 are connected to the two wires labeled "3" at the top. One advantage of the preferred arrangement of shared coils is that it has the potential to reduce the number of connections that feed through the bulkhead. By suitably arranging the taps and common connections, the upper receiver coils 110, 120, 130, 140, 150, 160 can be connected with only seven wires, as shown in FIG. 3, in which the main receiver coils again numbered 1–6. The wiring bundle is preferably twisted together between each coil and under each coil.

Specific details of an alternative exemplary configuration for the tool array are set out below. Note that coils with minus sense are wound in the opposite direction than the remainder of the coils. This embodiment differs from the one shown in FIG. 2 in that the 30 inch receiver set has been moved from above the transmitter to below the transmitter, with the result that the 18 inch set, which remains above the transmitter, does not share any coils. For an array having an effective coil diameter of 2.695 inches, a 0.066 inch winding pitch, and an 1.100 inch diameter feed pipe Table 1 gives the preferred numbers of turns and preferred positions of each coil center (based on filamentary loop coils, one loop per turn).

TABLE 1

| Coil Set | Turns | Inches |
| --- | --- | --- |
| Transmitter | 200 | 00.000 |
| Receiver Array 1 at 78" | 47 | 78.035"* |
| (above and below transmitter) | −29 | 66.525"** |
| Receiver Array 2 at 69" | −47 | 78.035"* |
| (above and below transmitter) | 104 | 69.000"* |
|  | −47 | 59.950"* |
| Receiver Array 3 at 54" | −47 | 59.950"* |
| (above and below transmitter) | 101 | 54.000" |
|  | −47 | 47.988"* |
| Receiver Array 4 at 42" | −47 | 47.988"* |
| (above and below transmitter) | 106 | 42.000" |
|  | −47 | 35.968"* |
| Receiver Array 5 at 30" | −11 | 34.780"** |
| (below transmitter only) | 29 | 30.000" |
|  | −11 | 24.135" |
| Receiver Array 6 at 18" | −11 | 24.135" |
| (above transmitter only) | 25 | 18.000" |
|  | −11 | 15.056" |

*shared coils
**end-tapped coils

Figure 7:
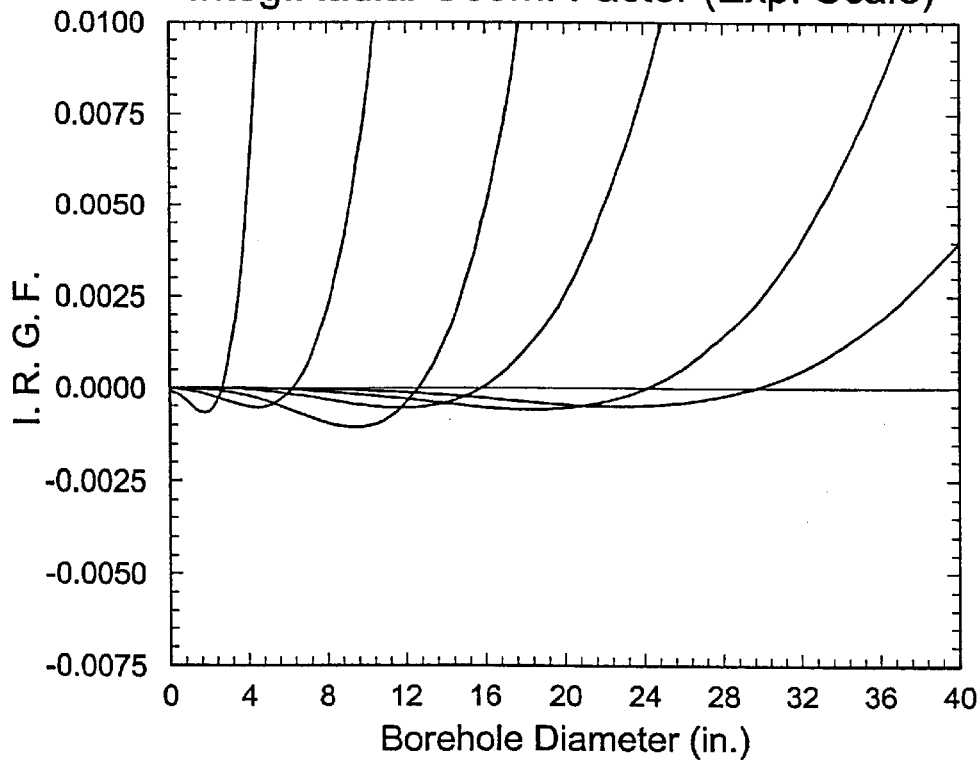
FIG. 7 is a plot of the integrated radial geometric factors of FIG. 6, shown in exponential scale.

Raw vertical and integrated radial geometric factor (VGF and IRGF) plots in FIGS. 4 and 5 show the response of the foregoing elemental measurements. These were computed based on point receiver coils but with the single transmitter coil split into several point dipoles. The weights calculated to achieve the target radial responses are shown in Table 2. Blank entries mean that that elemental measurement is not used. Again, elemental array 1 is deepest and 6 is shallowest. These weights achieve the IRGF responses shown in FIGS. 6 and 7. It will be understood that the numbers, size, spacing and weights for the coils in the array can be varied, and can be optimized for various desired target depths.

TABLE 2

| $r_{50\%}$ | $w_1$ | $w_2$ | $w_3$ | $w_4$ | $w_5$ | $w_6$ |
| --- | --- | --- | --- | --- | --- | --- |
| 120 | 1.126 | −0.126 | — | — | — | — |
| 90 | — | 1.045 | −0.045 | — | — | — |
| 60 | — | −0.569 | 1.569 | — | — | — |
| 30 | — | −1.567 | 1.075 | 0.865 | 0.627 | — |
| 20 | — | −0.25 | −0.569 | −0.036 | 1.506 | 0.348 |
| 10 | — | — | 0.380 | −0.029 | −1.492 | 2.142 |

Extracting Phase Information from the Digitized Waveform

In order to simplify the electronics needed to process the received signal, it is preferred to digitize the receiver waveforms and to use digital signal processing to perform the phase-sensitive detection. This eliminates the heavy analog filtering required by the analog phase-sensitive detectors, which forms a substantial portion of the electronics in prior art devices. Hence, a preferred embodiment of the present system includes a digital signal processor (DSP) that performs filtering and phase-detection downhole.

In order to obtain meaningful information from the received signals, it is necessary to make phase-sensitive measurements of the receiver voltages. This entails measuring the portion of the receiver voltage that is in-phase with the transmitter current. One preferred method is to measure both the transmitter current and receiver voltage with respect to an arbitrary phase reference and then divide the two complex voltages. To do this, it is necessary to measure in-phase and quadrature voltages with respect to the arbitrary phase reference.

Fast A/D converters and microcontrollers or DSPs are now available to digitize the receiver waveform and to do the phase-sensitive detection digitally. Some prior art devices digitize the waveform from each receiver. These devices stack waveforms and use an FFT to extract the components at the different frequencies. In contrast, the preferred embodiment of the present tool uses only two frequencies. A novel, preferred method of stacking the waveforms and extracting the R and X signals at two frequencies from the digitized waveform is described in detail as follows.

The preferred technique stacks a large number of waveforms to produce an averaged waveform. This averaged waveform can be plotted for diagnostic purposes if desired, but the primary goal is to measure the two phase components of the two frequencies of interest. The period of this averaged waveform is the period of the lowest frequency of interest, $f_L$. According to the present technique, the waveform must be sampled at a rate that is at least twice the highest frequency of interest, $f_H$. The highest frequency must be an integer multiple of the lowest frequency for the composite waveform to be periodic with the period of the lowest frequency. The strategy is to divide the period of the lowest frequency into B bins. Each bin represents a discrete phase and its purpose is to average together all A/D samples of like phase that are sampled over a certain time window. Each bin is 360/B degrees apart in phase of the low frequency $f_L$. The waveform is sampled every B' bins, where B' and B are relatively prime, i.e. have no common factors. The value of B' is referred to herein as the "stride." The time difference between two bins is $1/(B \cdot f_L)$. The A/D sampling rate is $(B \cdot f_L)/B'$. To satisfy the Nyquist criterion, this rate must be more than twice the highest frequency, so $(B \cdot f_L)/B' > 2f_H$. If B' and B have no common factors, then after B samples, the sample number (B+1) will be placed in the same bin as the first sample. If B' and B are chosen in error to have a common factor, this wrap will happen sooner, and bins will be skipped.

In operation, the stacking process proceeds as follows. A digital waveform generator generates the frequencies $f_L$ and $f_H$. There could be a separate generator for each frequency, or the sum of the two waveforms could be stored in the generator. There could be other frequencies between $f_L$ and $f_H$, but they must be integer multiples of $f_L$. The waveform generator output is amplified and sent to the transmitter coil(s). There is preferably a separate amplifier and A/D converter for each receiver coil, as well as a separate A/D that digitizes the transmitter current. The A/D and the D/A converters are preferably clocked with a single clock, so that the measurement system is locked in phase with the transmitted waveform. The downhole processor keeps track of the current bin. For each channel, the current A/D sample is added to the contents of the current bin and the count for that bin is incremented. Then the bin number is incremented by B'. If the result is greater than B, then B is subtracted. This process repeats. When an answer is desired, an average for each bin is computed, and the bins are initialized to zero.

As a result of the foregoing process, A/D samples at the same phase are summed and averaged together in each summing bin. The resulting average represents a waveform that is sampled more finely than actual sampling rate and can be plotted for diagnostic purposes, if desired. To extract the R component of the frequency f, which is either $f_L$ or $f_H$ or a multiple of $f_L$ between $f_L$ and $f_H$, the averaged waveform $x_i$ for the $i^{th}$ bin is multiplied by the sine of the angle $(2\pi fi/B)$ where f is the frequency of interest, and the product is summed.

$$V_R = \sum_{i=0}^{B-1} \sin\left(2\pi f \frac{i}{B}\right) x_i \quad (6)$$

$$V_X = \sum_{i=0}^{B-1} \cos\left(2\pi f \frac{i}{B}\right) x_i \quad (7)$$

By way of example only, the sine and cosine coefficients can be stored in a look-up table. This amounts to taking the dot product of the bin average vector and a "filter" vector containing the proper trigonometric function.

At the conclusion of each measurement cycle, $V_R$ and $V_X$ for each frequency and channel are transmitted to the surface. The values of $V_R$ and $V_X$ for the two frequencies can be used to derive the phase and magnitude of the two frequency signals. Specifically, the phase is given by $\tan^{-1}(V_X/V_R)$ and the magnitude is given by $(V_R^2 + V_X^2)^{1/2}$.

The bins are then cleared, and the process is repeated. During the time the summation and data transmission are performed, as during data accumulation, the transmitted waveforms continue and the bin number is incremented, so as to keep the bin count in sync with the transmitted waveform.

Figure 8:
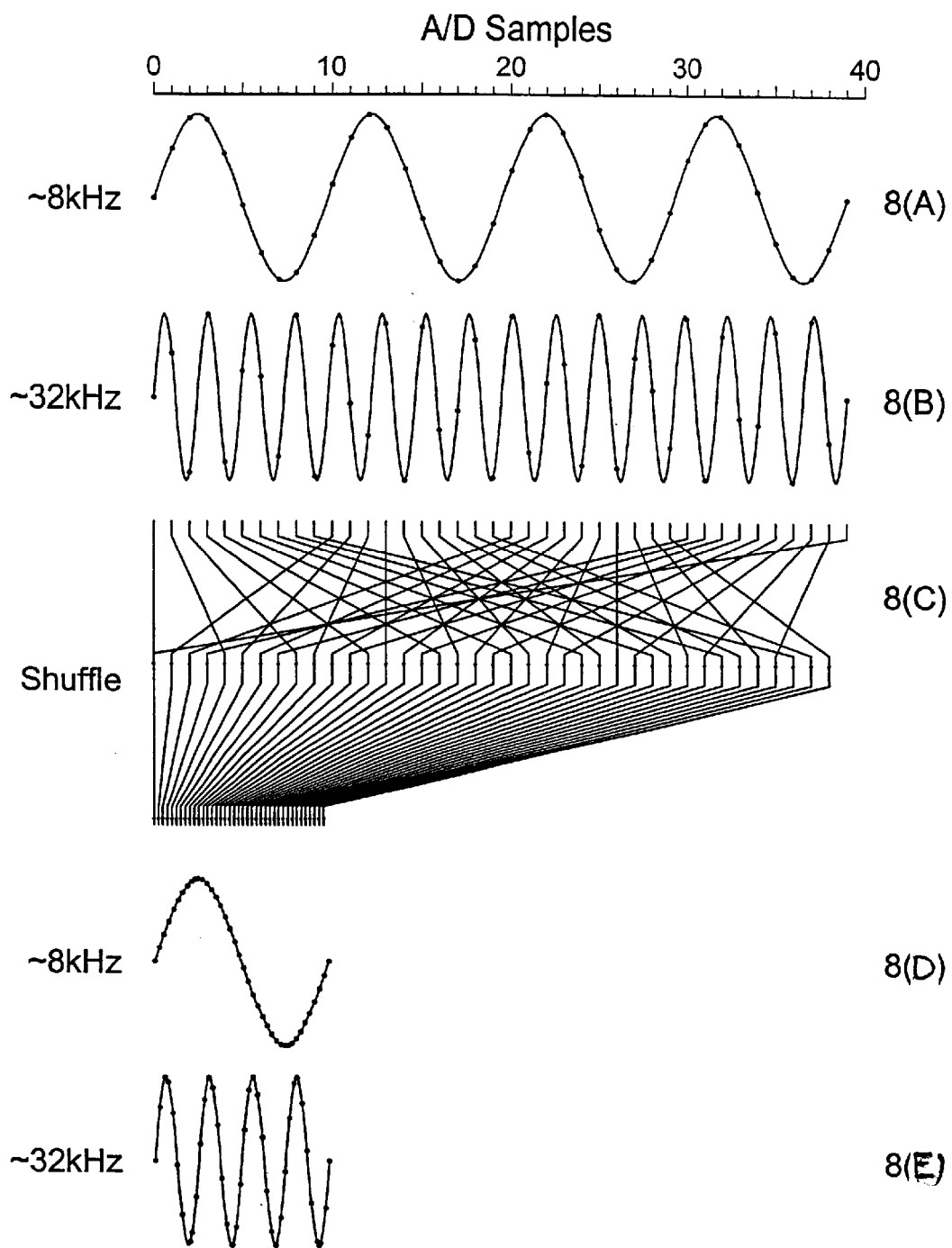
FIG. 8 is a series of plots illustrating one embodiment of the present digital data extraction.

FIG. 8 illustrates the foregoing process on a pair of hypothetical waveforms. Plots (A) and (B) are plots of pure signals at 8.0128205 kHz and 32.051282 kHz, respectively, such as might be used to drive a transmitter. The actual waveform seen by each receiver will be a sum of these two waveforms with arbitrary phase shifts on either one. The actual received waveform will also contain random thermal noise as well as other noise. The dots on each plot represent A/D sampling. Because FIG. 8 illustrates an embodiment in which 39 bins are used (B=39), in each waveform (A) and (B), the sample number 0 has the same value and phase as sample number 39.

After a predetermined number of cycles through the shuffling process shown in 8(C), the contents of each bin are averaged, (i.e. the contents are summed and the total is divided by the predetermined number of cycles) and the results are one cycle of the ~8 kHz waveform 8(D) and 4 cycles of the ~32 kHz waveform 8(E). After the shuffling process, the waveforms are more finely sampled in phase by a factor of 4 and the data are effectively compressed into one-fourth (1/B') as many cycles as were encompassed by the original number of bins.

After averaging the contents of each bin, most of the noise averages out to nothing. The thermal noise and quantization errors are averaged out in two stages. If, for example, $(f_H \cdot i)=32$ kHz, it is necessary to sample at a rate of at least 64 kHz to satisfy the Nyquist criterion. For a 50 ms acquisition time, this corresponds to at least 3200 A/D samples. If there are 100 bins, so that B=100, each bin will receive 32 samples, for a 6-fold reduction of noise. The dot product further reduces the noise by a factor of $B^{1/2}$.

Example

Figure 9:
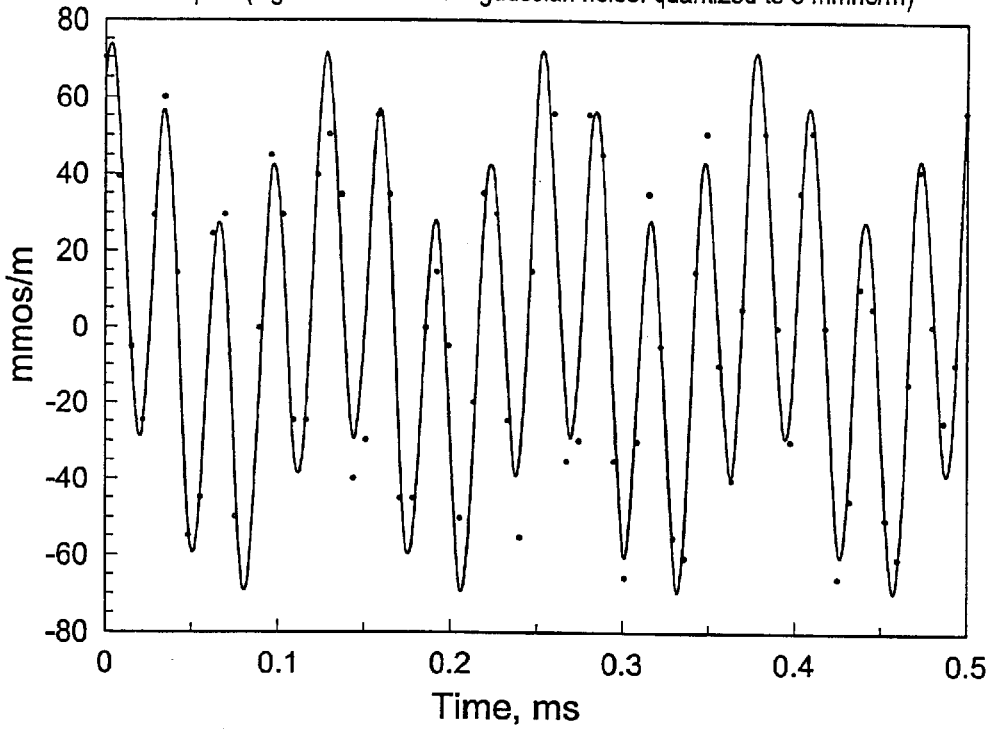
FIG. 9 is a portion of a theoretical waveform and representative A/D samples generated using the present system.
Figure 10:
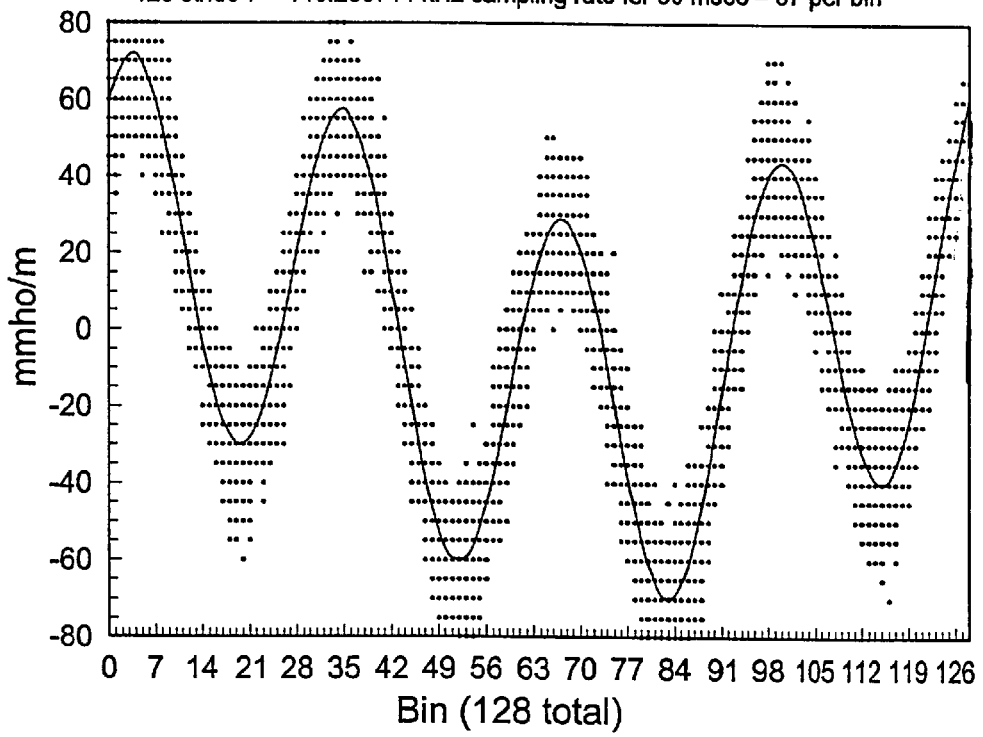
FIG. 10 is a plot of the results of the present data sampling system.
Figures 11, 12:
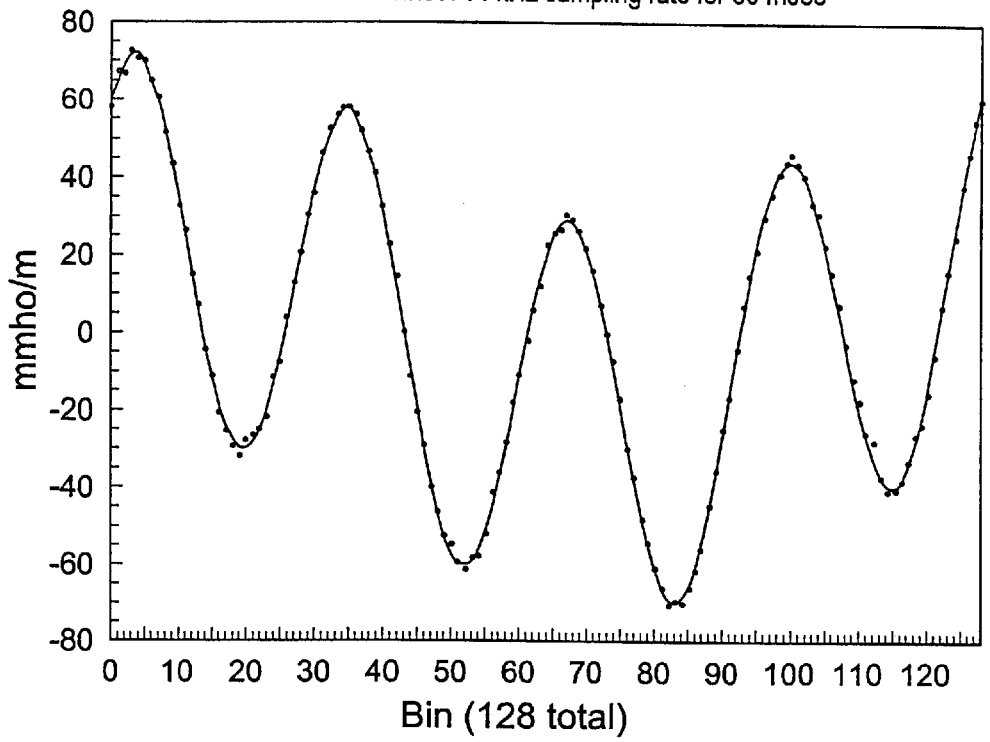
FIG. 11 is a plot showing the averaged data from FIG. 9 compared to the theoretical waveform.
FIG. 12 illustrates how log responses can be assembled in matrix form to find the unknown filter coefficients.

This phase separation process can be modeled. One exemplary model uses frequencies of 8 and 32 kHz. The following simulations were performed with B=128 and B'=7, giving a sampling rate of 146.286 kHz. The following figures assume a conversion time of 0.050 seconds, 5 mmho/m per lsb, and 10 mmho/m noise level. For $R_{8\,kHz}$=10 mmho/m, $X_{8\,kHz}$=20 mmho/m, $R_{32\,kHz}$=30 mmho/m, and $X_{32\,kHz}$=40 mmho/m, FIG. 9 shows a portion of the theoretical received waveform (the curve) and representative A/D samples (the points). After 7296 samples, the acquisition stops, and there are 57 values in each bin. FIG. 10 shows the contents of the bins. Several points overlay because of the discretization of the A/D converter. In FIG. 11, the averaged contents of each bin (the points) are compared to the theoretical waveform (the solid curve). The measured waveform (reconstructed by multiplying the measured voltages by the sines and cosines) is the dashed curve. Importantly, the dashed curve nearly overlays the theoretical curve. One can clearly see the two levels of noise reduction. The first is evident in that there is much less scatter in the points on FIG. 11 than in FIG. 10. The second level of noise reduction is evident in the degree to which the reconstructed waveform matches the measured waveform.

It will be understood that the shuffling process described above, which allows extraction of digital data, allows finer sampling and eliminates noise, can be performed in a variety of ways. For example, instead of shuffling the sampled values before averaging, the average values could be shuffled or the weighting factors themselves can be shuffled. Regardless of how it is carried out, the foregoing A/D conversion scheme has numerous advantages. The R and X signals at the frequencies of interest are computed simultaneously; the algorithm gives a single set of measured voltages (or apparent conductivities) that represent an average over the whole acquisition time; the waveform is effectively sampled more finely than the A/D sampling rate; the bin summing process can be continuously computed on the fly without a need to store the samples in memory; and the waveform can be plotted for diagnostic purposes if desired.

The bandwidth of the process was found to be equal to the reciprocal of the acquisition time. The ripple outside the band can be controlled by using a weighted average with some windowing function instead of a straight average.

In one embodiment, it was found to be desirable to generate the transmitted waveform and drive the A/D converter with the clocks derived from the same master clock. This locks the phase of the transmitted waveform and the phase detection system. One particular A/D device outputs A/D samples at a rate of 78.125 kHz when clocked with a frequency of 5 MHz. It was found expedient to use a frequency of 10 MHz to drive the waveform generator. Both of these frequencies were obtained by dividing down a higher frequency system clock. From the choice of coil spacings and the expected conductivity range and the number of powers of conductivity used in equation 13, it was found expedient to use a frequency $f_L \approx 8$ kHz. With these constraints, a search for the values of B and B' found the following combinations that yield frequencies near 8 kHz:

| B | B' | $f_1$, kHz |
|---|---|---|
| 39 | 4 | 8.0128205128 |
| 77 | 8 | 8.1168831169 |
| 79 | 8 | 7.9113924051 |
| 155 | 16 | 8.0645161290 |
| 157 | 16 | 7.9617834395 |

Of these, the simplest choice (as well as the closest to the desired 8 kHz) is 39 bins stride 4. This is the configuration illustrated in FIG. 8.

The multiplication by the sines and cosines can take place at the surface or downhole in a microcontroller or DSP. If the contents of the averaging bins is sent to the surface and recorded, any frequency that is a multiple of $f_L$ that is less than the half the A/D rate can be extracted provided these frequencies are in the present in the spectrum of the transmitter current waveform.

Vertical Deconvolution

Induction tools measure apparent conductivities that suffer from a variety of environmental effects. Chief among these are skin effect and shoulder (or adjacent bed) effect. The two are intertwined. The vertical response varies with the conductivity level. Various methods exist for correcting for these effects. An effective system requires a deconvolution over depth. Most prior art deconvolution techniques are not well suited to the asymmetrical elemental measurements of an array tool. The present invention includes a new method of deconvolving the elemental measurements to match the vertical responses prior to any radial combination and a method for finding the corresponding filters.

Induction tools measure the voltage of a set of receiver coils typically wound in series. The receivers are arranged so that the direct mutual coupling from the transmitters is nulled. In low conductivity homogeneous formations, the voltage induced in the receiver coils is proportional to the formation conductivity. The voltage multiplied by the appropriate "tool constant" will produce an apparent conductivity that is correct in the low-conductivity limit, but will be less than the actual conductivity in high-conductivity formations. This nonlinearity is commonly called "skin effect."

In a homogeneous medium a two-coil sonde will read:

$$\sigma_a = \sigma - a_0 \sigma^{3/2} - a_1 \sigma^{5/2} - a_2 \sigma^{7/2} - \ldots \quad (8)$$

To make the apparent conductivity read correctly in a homogeneous medium, a function is applied to the reading.

$$\sigma_b = f(\sigma_a) \quad (9)$$

Since $\sigma_b > \sigma_a$ over the range where the tool is commonly used, this procedure is called "boosting." Before the advent of the digital computer, this boosting function was implemented as an analog function former. On a computer, there are various ways of constructing or tabulating the boosting function $f$. Since $\sigma_a \approx \sigma$ in low conductivities, the following functional form has been found to be convenient.

$$\sigma_b = \sigma_a + c_0 \sigma_a^{3/2} + c_1 \sigma_a^{5/2} + c_2 \sigma_a^{7/2} + \ldots \quad (10)$$

This can be rearranged to a power series in $\sigma_a$ that can be truncated to a polynomial:

$$(\sigma_b - \sigma_a)/\sigma_a^{3/2} = c_0 + c_1 \sigma + c_2 \sigma + \ldots \quad (11)$$

The linear least-squares technique can then be used to fit a polynomial to the data from a computer model over a selected conductivity range.

In addition to skin effect, induction tools suffer from shoulder or adjacent bed effect. The measurements at a particular depth are influenced by formations a significant distance above and below the tool. If one uses the correct homogeneous boosting function, one will find that the induction response is nonlinear. That is, if one generates a simulated log through a formation and then generates a second log through a formation that has all of the resistivities scaled by a constant, the second simulated log will not be merely the first log scaled by the same constant. The shape of the log varies with resistivity level. It is necessary to correct for skin effect and shoulder effect simultaneously so as to linearize the response. Several methods can be used. It is known to use the X-signal (quadrature signal) to accomplish this, as disclosed and described in U.S. Pat. No. 4,513,376, which is incorporated herein in its entirety.

Another known method, disclosed and described in U.S. Pat. No. 5,146,167, which is incorporated herein in its entirety, uses the apparent conductivity raised to the power 3/2. The formula used is $$\sigma_P(Z) = \alpha \, [\sigma_a(Z)] \sum_i f_i \sigma_a(z - d_i) + \beta \, [\sigma_a^{3/2}(Z)] \sum_i g_i \sigma_a^{3/2}(z - d_i) \quad (12)$$

The functions $\alpha$ and $\beta$ work together to make the tool read correctly in a homogeneous formation. The deconvolution filters f and g work in concert to shoulder effect correct the tool. Finding the boosting functions $\alpha$ and $\beta$ and the filter coefficients f and g is a nonlinear problem, since the boosting function multiplies the output of the convolution. Because the present tool is asymmetrical, prior art techniques for finding the filter coefficients are cumbersome. It is therefore desirable to provide an efficient method for finding the filter coefficients.

In a homogeneous formation, the functions $\alpha$ and $\beta$ are necessary to account for the higher order (greater than 3/2) terms neglected from equation (8). The preferred method is to use a different filter for each power needed in fitting equation (9). A preferred formula is:

$$\sigma_q(z) = \sum_j \sum_i f_{ij} \sigma_a^{p_j}(z - d_i), \quad (13)$$

where the powers $p_j$ are given by $p_j = 1, 3/2, 5/2, 7/2, 9/2, \ldots$

The filter coefficients for a particular power should sum to the corresponding homogeneous boosting coefficient above for the tool to read the correct value in a homogeneous medium.

$$\sum_i f_{ij} = c_{ij} \quad (14)$$

To find the unknown filter coefficients $f_{ij}$, one first finds a set of boosting coefficients $c_j$ that approximate equation (2). One method is to use the least-squares fit to the polynomial. The more difficult problem is to find the actual filter coefficients $f_{ij}$. One method of finding the unknown coefficients $f_{ij}$ is to use several simulated logs at different resistivity levels and then use the method of linear least squares to find the coefficients that best match a set of target logs. A computer model that simulates an induction tool in a layered formation can be used to tabulate simulated logs. This amounts to solving the linear system of equations Ax=b where the A matrix is filled with the simulated raw logs and the b vector is filled with the target log. The solution which minimizes the residual Ax−b can be found by the method of linear least-squares using a canned routine.

The unknown vector x contains the filter coefficients. The coefficients for all of the powers can be stacked into a single column vector. The simulated logs fill the A matrix and the target logs fill the b vector. Numerous simulated logs can be stacked so long as there is a target log for each. The system can then be written as shown in FIG. 12. There are p different powers. Each of the $s_{i,(2j-1)/2}$ is a row vector containing a section of simulated log. A total of m different simulated logs. For $s_{i,1}$, the log is just the conductivity log in units of mhos/m. Each element of $s_{i,3/2}$ is equal to the corresponding element of $s_{i,1}$ raised to the power 3/2. The higher powers are filled in a similar fashion. The length of each log section is n, the same as the length of each filter, so each $f_j$ is a column vector of length n. There are p different filters corresponding to the powers 1 to (2p−1)/2. Each $t_i$ is a column vector that contains a target log, the desired output of the processing. The shifting by one sample is necessary to implement the convolution of the filter coefficients with the simulated log.

The A matrix is partitioned into two parts. The bottom p rows in A are to make the filter sums equal to the homogeneous coefficients to satisfy $\Sigma_i f_{ij} = c_j$. The 0 and I are row vectors of length n filled with zeroes and ones, respectively. (It is possible to build this relationship into the top part of the system and reduce the number of unknowns in each filter by one, but this is notationally tedious, and the extra rows at the bottom extra p rows represent a small percentage of the total size of A.)

Each row of the A matrix together with the corresponding entry in the right-hand side vector can be weighted by an importance factor. The extra equations to $\Sigma_i f_{ij} = c_j$ can be weighted heavily, since this is a requirement for the tool to read correctly in a homogeneous medium.

Figure 13:
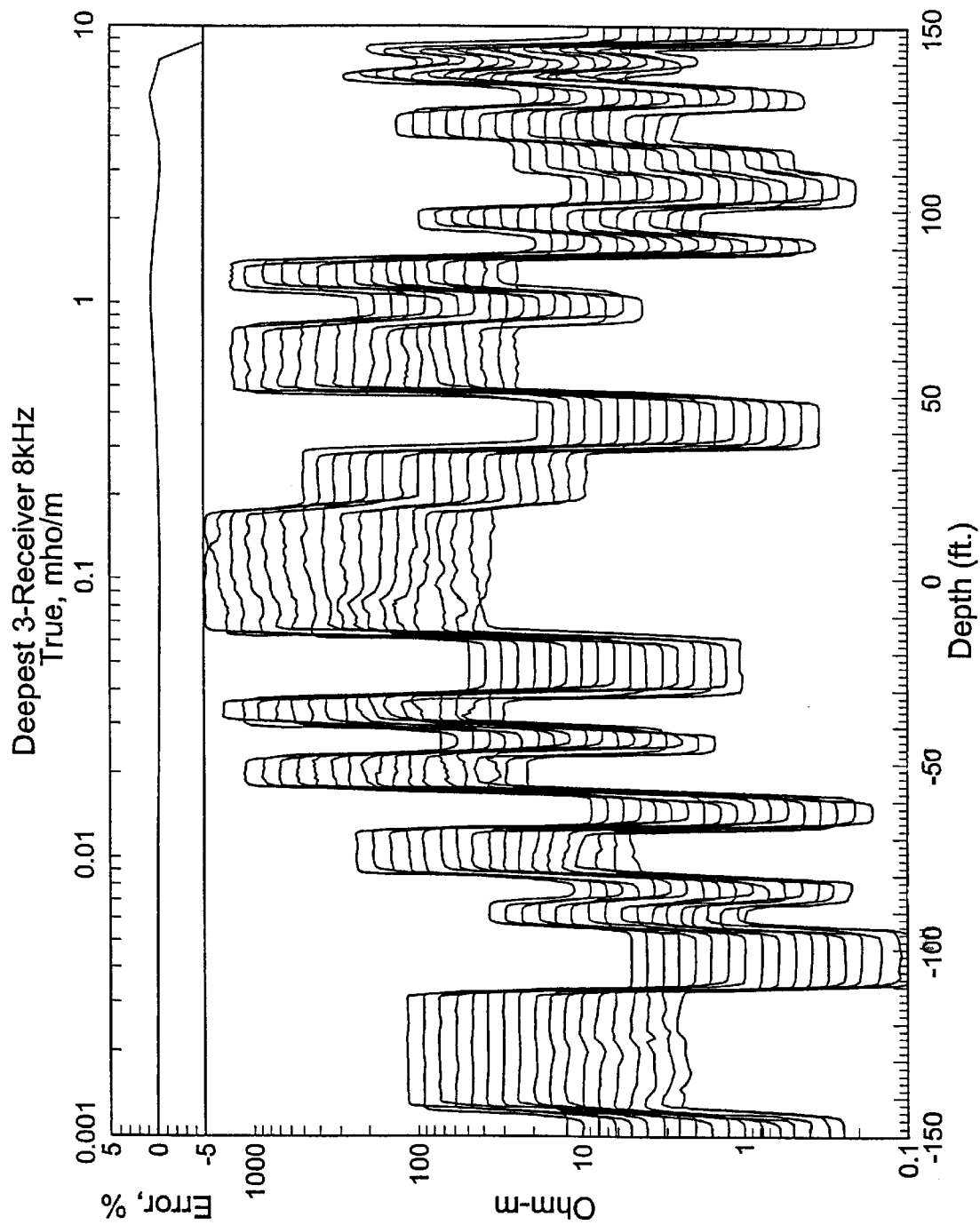
FIG. 13 is a plot showing results of a hypothetical system deconvolved with the new algorithm.

For p=5, n=401 (at quarter foot samples), 22 different Oklahoma profiles at various resistivity levels were used as the simulated logs. Each log was 150 feet (601 logging points). The resulting A matrix is 13,227 by 2005 columns, over 100 MB at 32-bit single precision. The filters were designed by using the Oklahoma formation at numerous conductivity levels. FIG. 13 shows the deepest three-receiver measurement (but only the upper one) deconvolved with the new algorithm. The operating frequency was 8 kHz. The top track shows the error in the homogeneous boosting function versus true formation conductivity.

Operating Frequency

The X-signal has been shown to be adversely affected by contrasts in magnetic permeability. For this reason, some prior art deep signal processing uses the X-signal only in low resistivity formations, and does not use it in medium signal processing. Reducing the operating frequency could eliminate the remaining need for the X-signal in the deconvolution. The amount of skin effect goes as $f^{1/2}$ but signal strength goes as $f^2$. Hence, reducing the frequency reduces the sensitivity much more quickly than it reduces the skin effect. If an objective is to use the difference in the response at different frequencies to measure some unknown frequency dependence of the formation, the frequency range must be small enough so as to achieve sufficient signal at the lowest frequency. Because there is no particular advantage to having a multi-frequency tool, the preferred system includes a dual-frequency tool with both frequencies operating simultaneously. It is desirable to reduce the operating frequency, to reduce the need for the X-signal in low resistivities. On the other hand, it is desirable to raise the frequency to get more signals in high resistivities. The simplest solution is to pick two frequencies and measure both simultaneously. In a preferred embodiment, frequencies of approximately 8 and 32 kHz are used. This 4:1 frequency ratio gives a 16:1 signal level ratio (for the same transmitter current). The 32 kHz gives 2.56 times as much signal as a 20 kHz (for the same transmitter current. To simplify the signal processing and to further reduce the magnetic permeability effects, it may be desirable to eliminate the X signal.

Operation

In operation, the first step is to convert the raw measurements into units of apparent conductivity. This is done using tool constants calculated during shop-calibration. Next, the sonde errors, also from shop-calibration, are subtracted from each measurement. At this point, there are 10 different apparent conductivity signals, both in-phase and quadrature, at the two operating frequencies.

The caliper information and mud resistivity measurements are convolved to subtract out the cave effect from each receiver measurement, using any suitable algorithm.

There is one set of filter coefficients $f_{ij}$ for each of the ten receiver channels at both frequencies, twenty sets in all. The deconvolution filters apply the depth matching as well. There will be two sets of twenty filters—one set for the one-foot vertical resolution and another set for the two-foot resolution. The present deconvolution accomplishes the following: skin-effect correction, shoulder-effect correction, depth alignment, symmetrization (in the absence of invasion), and resolution matching.

After deconvolution, the measurements from the lower receiver coils are combined with the corresponding measurements from the upper receiver coils. This results in the six different depths of investigation. The deepest four of the six will be fully symmetric in depth in the presence of invasion.

The six apparent conductivity curves depths of investigation are combined with various weighting functions to produce the final 10, 20, 30, 60, 90 and 120 inch depths of investigation. Optionally, the cross-sectional image of the invasion front can be produced.

Auxiliary Measurements

In order to perform accurate environmental corrections, the foregoing discussion assumes that the following auxiliary measurements are present either in the tool itself or elsewhere in the tool string:
1. A z-axis accelerometer to perform speed correction to correct for erratic tool motion.
2. A mud resistivity sensor for accurate borehole correction.
3. A caliper to perform accurate borehole and cave correction of the shallow curves of 10 and 20 inch depths of investigation.
4. A measurement of sonde temperature to compensate for any temperature-dependent sonde drifts.
5. A measurement of stand-off to improve the accuracy of the borehole correction for the 10 and 20 inch depths of investigation.

While a preferred embodiment of the present invention has been shown and described, it will be understood that various modifications could be made to the foregoing process and apparatus without departing from the scope of the invention.

What is claimed is:

1. A method of deriving an apparent conductivity log from raw elemental readings from a sonde comprising a plurality of receiver coils, the method comprising:
   (a) generating at least one digital signal comprising a plurality of frequencies using at least one transmitter;
   (b) receiving analog responses from the at least one digital signal through the plurality of receiver coils;
   (c) converting the analog responses from each receiver coil into digital signals by sampling the analog responses by phase and averaging samples of a common phase in a manner such that the resulting average represents a raw elemental waveform that is sampled more finely than the actual sampling rate;
   (d) raising each raw elemental waveform to several predetermined powers to generate a plurality of powers of conductivity;
   (e) convolving in depth the powers of conductivity with a plurality of filters, where each power has a distinct filter; and
   (f) summing the results of all of the convolutions to produce a conductivity log that is substantially free from the effects of adjacent beds and the nonlinear effects of true conductivity.

2. The method of claim 1 wherein steps (a) and (c) comprising generating digital signals and converting analog signals using A/D converters with a common clock to lock converted digital signals in phase with the generated digital signal.

3. The method of claim 1 wherein the plurality of frequencies comprises two frequencies.

4. The method of claim 1 wherein step (c) comprises shuffling the samples of a common phase.

5. The method of claim 4 wherein step (c) comprises shuffling the samples of a common phase after the samples are averaged.

6. A method of deriving an apparent conductivity log from at least one induction well log comprising a plurality of depth samples generated from an asymmetrical sonde, comprising:
   (a) raising each depth sample of the apparent conductivity signal to a plurality of predetermined powers to generate a plurality of powers of conductivity;
   (b) convolving in depth the powers of conductivity with a plurality of filters, where each power has a distinct filter and where the plurality of filters are determined by solving a linear set of equations; and
   (c) summing the results of all of the convolutions to produce a conductivity log that is substantially free from the effects of adjacent beds and the nonlinear effects of true conductivity.

7. The method of claim 6 further comprising
   (d) comprises summing the results of the convolutions using weighting factors to produce a plurality of conductivity logs representing a plurality of depths of investigation.

8. The method of claim 6 wherein the plurality of predetermined powers comprises integer multiples of one-half.

9. The method of claim 8 wherein one of the plurality of predetermined powers comprises one.

10. The method of claim 9 wherein the remaining predetermined powers comprise odd integer multiples of one-half.

11. A method of deriving an apparent conductivity log from a plurality of induction well logs each comprising a plurality of depth samples, comprising:
   raising each depth sample of the plurality of induction well logs to a plurality of predetermined powers to generate a plurality of powers of conductivity;
   vertically deconvolving the powers of conductivity with a plurality of filters, where each power has a distinct filter; and
   combining the results of the deconvolutions using weighting factors to produce apparent conductivity logs at a plurality of depths of investigation that are substantially free from the effects of adjacent beds and the nonlinear effects of true conductivity.

12. The method of claim 11 wherein the plurality of predetermined powers comprises integer multiples of one-half and includes a predetermined power of one.

13. The method of claim 12 wherein the balance of the plurality of predetermined powers comprises odd integer multiples of one-half.

14. The method of claim 11 wherein the plurality of depths of investigation comprises depths of investigation of 10, 20, 30, 60, 90, and 120 inches.

* * * * *